United States Patent [19]
Ryhiner et al.

[11] Patent Number: 5,520,812
[45] Date of Patent: May 28, 1996

[54] PROCESS FOR THE BIOLOGICAL PURIFICATION OF WATER

[75] Inventors: Gerhard Ryhiner, Winterthur; Kim Sörensen, Zurich; Bernard Birou, Winterthur, all of Switzerland

[73] Assignee: Sulzer Chemtech AG, Winterthur, Switzerland

[21] Appl. No.: 123,314

[22] Filed: Sep. 17, 1993

[30] Foreign Application Priority Data

Oct. 6, 1992 [EP] European Pat. Off. ............ 92810749

[51] Int. Cl.⁶ .................... C02F 3/10; C02F 3/28
[52] U.S. Cl. ............... 210/614; 210/616; 210/621; 210/903
[58] Field of Search ............ 210/605, 614–617, 210/620–622, 631, 903, 630

[56] References Cited

U.S. PATENT DOCUMENTS

| | | | |
|---|---|---|---|
| 4,756,831 | 7/1988 | Menzel et al. | 210/617 |
| 5,019,266 | 5/1991 | Soeder et al. | 210/614 |
| 5,228,997 | 7/1993 | Martin et al. | 210/617 |
| 5,322,621 | 6/1994 | Fan et al. | 210/615 |
| 5,348,653 | 9/1994 | Rovel | 210/617 |
| 5,403,487 | 4/1995 | Lodaya et al. | 210/616 |

FOREIGN PATENT DOCUMENTS

| | | |
|---|---|---|
| 0072495 | 2/1983 | European Pat. Off. |
| 0220142 | 4/1987 | European Pat. Off. |
| 0247212 | 12/1987 | European Pat. Off. |
| 0304734 | 1/1989 | European Pat. Off. |
| 0355022 | 2/1990 | European Pat. Off. |
| WO92/04284 | 3/1992 | WIPO . |

*Primary Examiner*—Thomas G. Wyse
*Attorney, Agent, or Firm*—Townsend and Townsend and Crew

[57] ABSTRACT

In the process, water, in which organic carbon, ammonium and nitrate are contained, is biologically purified. In a first reaction vessel (10) forming a denitrifying biofilm reactor the carbon is to a large extent eliminated under partly anoxic, partly aerobic conditions by the use of nitrate-containing oxygen, and molecular oxygen respectively. In a second, ventilated reaction vessel (20) the ammonium is converted at least partially by nitric bacteria into nitrates. Water containing nitrates is recirculated from the second into the first reaction vessel. In the first reaction vessel the water to be treated is conveyed from the top to the bottom via a flooded fixed bed. To supplement a deficiency in nitrate-containing oxygen in the elimination of carbon the fixed bed is ventilated in the base region with a gas which contains a metered amount of molecular oxygen. The process according to the invention is particularly suitable for the purification of waste water having a variable ammonium concentration.

15 Claims, 3 Drawing Sheets

PROCESS FOR THE BIOLOGICAL PURIFICATION OF WATER

BACKGROUND OF THE INVENTION

The invention relates to a process for the biological purification of water by decomposing organic carbon with nitrate and molecular oxygen.

European patent application EP-A-0 247 211 discloses a generic process in which by connecting a nitrification stage with a denitrification stage in front of it, ammonium and also organic impurities in waste water can be decomposed by microorganisms. The biomass formed by the microorganisms is present in the form of a so-called biofilm, which covers the surfaces of the packing material of a fixed bed. The biofilm reactor of the first stage, in which denitrification occurs, has a heterogenous nature: In a partly confined vicinity there are regions in which aerobic and anoxic or anaerobic conditions prevail. In the aerobic regions the decomposition of the organic carbon is performed with the use of the dissolved molecular oxygen. In these regions there is no denitrification. This occurs in the anoxic regions, by the nitrate-containing oxygen being used by the release of molecular nitrogen (or other nitrogen compounds) by the biomass. Both types of oxygen use are possible for microorganisms of the same species; in the event of a deficiency of molecular oxygen these microorganisms adapt their metabolism by switching over to denitrification.

The biological decomposition of the ammonium is restricted by a large supply of organic carbon. Only after the elimination of the carbon performed in the first stage can the ammonium-containing nitrogen be oxidized, first into nitrite, and then into nitrate by nitrifying microorganisms (so-called nitric bacteria) in the ventilated biofilm reactor of the second stage. The nitrate is an intermediate product which is to be decomposed—by denitrification. A part of the nitrate-containing product water of the nitrification stage is returned to the first stage. As molecular oxygen is dissolved in the returned water because of the ventilation of the second state, an aerobic zone is produced in the entry region of the first stage, where denitrification occurs only to a limited extent. (As explained in more detail below by means of a Figure, an anoxic region where the desired denitrification takes place can also be formed in the presence of molecular oxygen.) If the supply of molecular oxygen is exhausted at some distance from the inlet point, then the full use of nitrogen-containing oxygen commences.

The organic carbon, i.e. the carbon which is contained in the biologically decomposable constituents of the waste water, is partly present in its dissolved form and partly in its immobile form enclosed in suspended solids. Only the dissolved organic carbon or the organic carbon which can be leached from the suspended solids is substantially susceptible to biological decomposition in the biofilm reactor. As the suspended solids are partly adsorbed on the biofilm, this impurity in the form of suspended solid particles or colloids is also eliminated.

The dissolved organic carbon is present in its easily decomposable and difficult to decompose form. The majority of the low-molecular alcohols (e.g. methanol or ethanol), acids (e.g. acetic acid), aldehyde and some more complex compounds (e.g. glucose) are easily decomposable; colloids, high-molecular compounds and humic acids decompose with more difficulty. When using nitrate-containing oxygen practically only the easily decomposable carbon can be eliminated. It is therefore important that the aerobic zone at the inlet region of the denitrification stage is kept minimal. The elimination of the more easily decomposable carbon is preferably also performed there, as a result of which the substrate suitable for the denitrification is partly lost.

In the known process denitrification is performed by means of a bioactive filter. With this reactor type the biofilm covers a granular base material, which in the form of ballast forms the fixed bed of the first reaction vessel. Together with the biological decomposition, the bioactive filter is also suitable for the removal of suspended solids; the suspended solids adsorbed on the base material and also a part of the growing biomass is removed as excess sludge from the purification process by a periodically performed flushing of the fixed bed by means of air and water.

In the second reaction vessel the fixed bed is constructed from a packing of laminar components having a regular geometrical structure (components of a static mixer). The nitric bacteria forming the biofilm have a far smaller growth than the microorganisms of the first stage; therefore rinsing is not required as often with the second stage.

The elimination of carbon should be performed as completely as possible in the first stage. At the same time as much nitrate as possible should be decomposed by using nitrate-containing oxygen. Only a deficiency of nitrate should be compensated by means of a supplementary supply of oxygen. If the ammonium content in the untreated water is not constant, there will be a variable supply of nitrate in the first stage and consequently the consumption of molecular oxygen will also be variable.

SUMMARY OF THE INVENTION

It is therefore an object of the invention to construct the first stage so that with respect to the supplementary supply of oxygen, there will be a variable supply so that denitrification is impaired as little as possible by the oxygen supplied.

The oxygen supplied by means of ventilation should be dissolved efficiently and uniformly in the water. This requirement can be met if the fixed bed is constructed the same as in the second reaction vessel as a packing of static mixer elements.

In the case of ventilated biofilm reactors with granular medium as the support for the biofilm, denitrification is impaired by the oxygen introduced (see Laursen et al., "Denitrification in submerged filters exposed to oxygen", 1992, Proceedings of European Conference on Natural Removal from Waste Water, University of Leeds UK, 1st–4th Sep. 1992). In contrast thereto, the ventilation of a fixed bed consisting of static mixer components has an advantageous effect (according to our own experiments; ventilation approx. 5 m/h, nitrate charging less than 1 kg/m$^3$d): The decomposition of nitrate is increased by roughly 20% when compared with a non-ventilated reactor. This unexpected advantage is presumably produced by the fact that the ventilation produces turbulence, which results in a substantial improvement in the transport of nitrate from the water into the biofilm. In the non-ventilated reactor, in which the water flows in a laminar manner, the transport of nitrate to the biofilm largely depends on diffusion and is therefore slow.

The invention is explained in more detail below by means of drawings.

DESCRIPTION OF THE PREFERRED EMBODIMENTS

Figure 1:
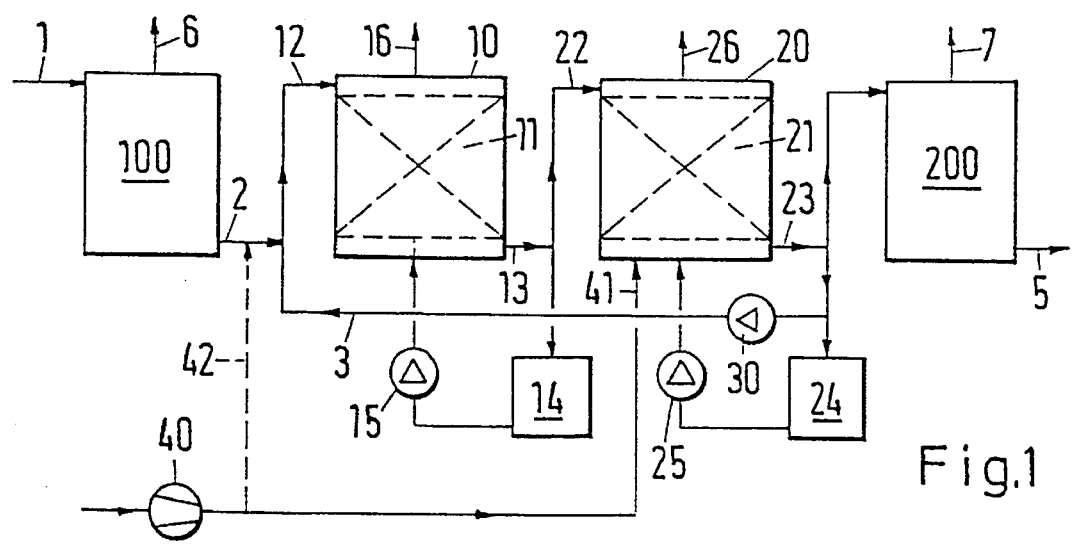
FIG. 1 shows a plant having a denitrification/nitrification installation.

In the plant shown in FIG. 1 there occurs the combination of denitrification and nitrification which is formed by the reaction vessels 10 and 20 and also the recirculating line 3 (including pump 30). After entering the plant the untreated water 1 first passes through a preliminary stage 100, in which suspended solids are partly removed. Then the presettled water 2 is mixed with the nitrate-containing water from recirculating line 3 and supplied via the inlet 12 to the reaction vessel 10 of the first stage with a fixed bed 11 disposed beneath the inlet. From the outlet 13 the product water of the first stage travels via inlet 22 into the second reaction vessel 20, where nitrification occurs in the ventilated fixed bed 21. From outlet 23 the product water of the second stage travels partially into the recirculating line 3 and partially into the filtration stage 200, where suspended solids are again held back and where the purified water 5 leaves the plant.

The supply of process air 41 into the second stage is performed with the fan 40. According to known teaching, molecular oxygen 42 can also be supplied into the presettled water 2 in order to increase the oxygen supply for the elimination of carbon in the first stage. The pumps 15 and 25, respectively, which convey flushing water out of reservoirs 14 and 24, respectively, are provided for flushing the fixed beds 11 and 21. Compressors for scavenging air may also be provided; however they are not shown in FIG. 1. The excess sludge 16 and 26 released during flushing is discharged from the reaction vessels 10 and 20, respectively, at their upper part. A discharge of sludge liquor 6 and 7 is also performed with the preliminary stage 100 and subsequent stage 200, respectively, by intermittent flushing.

Figure 2:
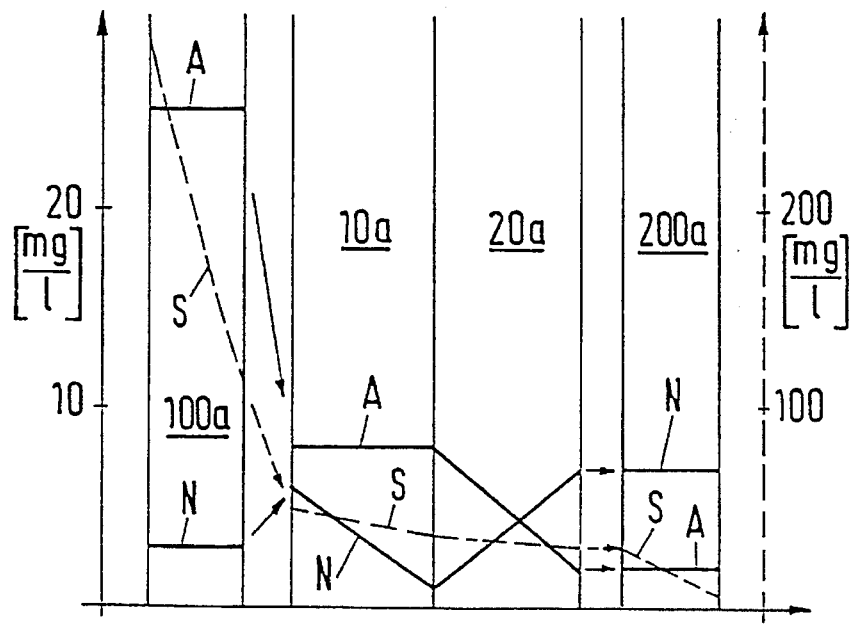
FIG. 2 shows an example of concentration profiles in the plant shown in FIG. 1.

The diagram of FIG. 2 shows by means of an example how the concentrations of the suspended solids, the nitrate and the ammonium change as the water to be treated passes through the plant. These concentration profiles are indicated by curve S shown as a broken line (suspended solids) and also the unbroken curves N (nitrate) and A (ammonium). The abscissa of the diagram indicates the path through the plant. For the concentrations of nitrate and ammonium a different scale has been chosen (unbroken ordinate) than for the concentrations of the suspended solids (broken ordinate). The regions 100a, 10a, 20a, and 200a of the diagram of FIG. 2 correspond to the four parts of the plant 100, 10, 20 and 200 shown in FIG. 1.

About two thirds of the suspended solids are retained in the preliminary stage 100. A reduction in the suspended solids content also occurs in the fixed beds of the two reaction vessels 10 and 20. Because of the recirculating line (recirculation roughly 300%) on the transition from region 100a, into region 10a, there is a marked reduction in the suspended solids content. The concentrations of the ammonium and nitrate show corresponding rapid changes. As curve N shows, denitrification occurs in region 10a, and nitrification in region 20a. Corresponding to the increase in the nitrate concentration, the ammonium in region 20a shows a reduction in concentration.

As is already the case with preliminary stage 100, the nitrate and ammonium concentrations in the filtration stage 200 remain unchanged, while the concentration of the suspended solids is further reduced there. It is of course possible and also known that the subsequent filtration can be developed further to a bioactive filter, in which a residual denitrification, supplied for example by methanol, is performed.

In the example described the biological oxygen consumption is as follows: 235 mg/l in untreated water 1; 45 mg/l at inlet 12; 25 mg/l at outlet 13; 15 mg/l at outlet 23; finally 8 mg/l or less in the purified water 5.

Figure 3:
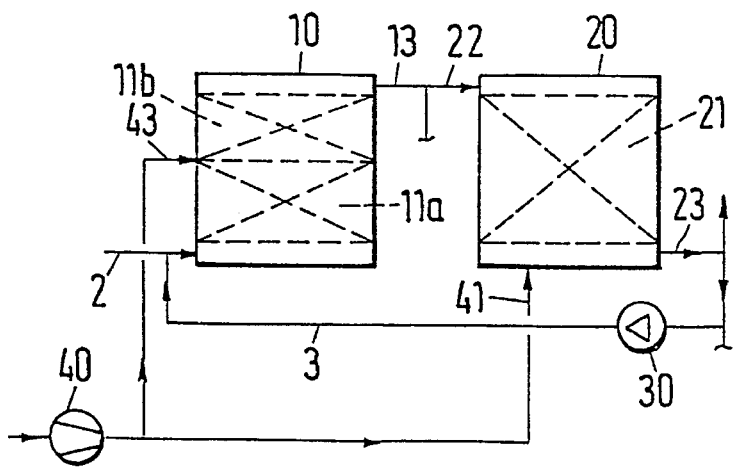
FIG. 3 shows a known installation with ventilation in the first stage.

European patent application A-0 247 212 also discloses a process in which the denitrification stage 10 is constructed as shown in FIG. 3. In contrast to the plant shown in FIG. 1, here the flow travels through the fixed bed 11a, 11b from the bottom to the top. For the carbon elimination in an aerobic zone a ventilated region 11b is provided in the upper region of the fixed bed (air supply 43). In the anoxic area 11a, lying beneath it denitrification occurs. A disadvantage of this process is that the boundary between the anoxic and the aerobic zone is predetermined. There cannot be a flexible reaction to a variable ammonium supply of the untreated water.

According to EP-A-0 247 212, a filter bed made of granular material is advantageously provided for denitrification in the reaction vessel 10, while a biofilm reactor is to be preferred for nitrification in the reaction vessel 20, during which the biomass is fixed on static mixers as components with a regular geometrical structure.

Figure 4:
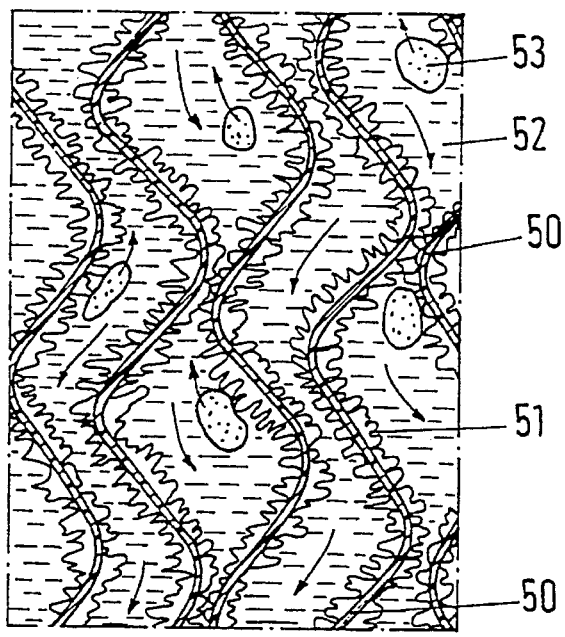
FIG. 4 shows a longitudinal section through a packing with static mixer components, FIGS. 5a, b show concentration profiles in the biofilm (simplified model representation)

FIG. 4 shows in detail a longitudinal section, i.e. a section in the vertical direction, through a flooded packing. The laminar components 50 having a regular geometrical structure, by which the packing is formed, are covered by the biomass 51, the so-called biofilm. The water to be treated 52 flows from the top downwards, while gas bubbles 53 from the ventilation rise in the counter-flow. The components 50 of the packing consist, for example, of regularly corrugated plastic plates, which are alternately disposed in such a way that the wave crests of adjacent elements are rotated with respect to one another by an angle of roughly 90° C. The corrugated plates 50 provide a large internal surface (125 to 500 $m^2/m^3$) of the packing. The three-dimensional structure of the packing enables an efficient ventilation with low back-mixing. There are no clearance volumes, as a result of which a high activity of this biofilm reactor is produced. The feeding rates ($m^3/m^2*h=m/h$) can be chosen from a wide range—adapted to the condition of the water to be treated: water velocity of between roughly 1 and 20 m/h; ventilation rate of normally between 5 and 20 m/h. A further advantage is the low drop in pressure.

As experience has shown, the packing having static mixer components unexpectedly comprises a good retention capacity for suspended solids. Thanks to this property a fixed bed having static mixer components can also be used during denitrification in the reaction vessel 10. With the installation according to the invention such a packing is provided for the first stage.

In biofilm reactors diffusion processes play an important role. This is explained in further detail by means of FIGS. 5a and 5b: In the biofilm 51, which for the purpose of simplification and within the context of a model is regarded as being a layer of constant thickness, there occurs the transport of the substrate (organic carbon which is easy and difficult to decompose) and of the oxidizing reaction partner (nitrate, molecular oxygen) to the microorganisms by diffusion. The profiles of the concentrations c, which comprise these substances, are represented by the curves C, K, N and O (according to the sequence given above). For the sake of simplicity it is assumed that the solubility of the substances in the biofilm is the same as in water (but this does not need to correspond to reality, in particular in the case of carbon which decomposes with difficulty).

Figure 5A:
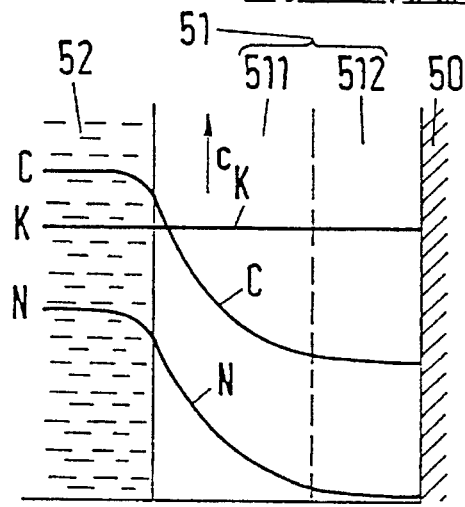
Figure 5B:
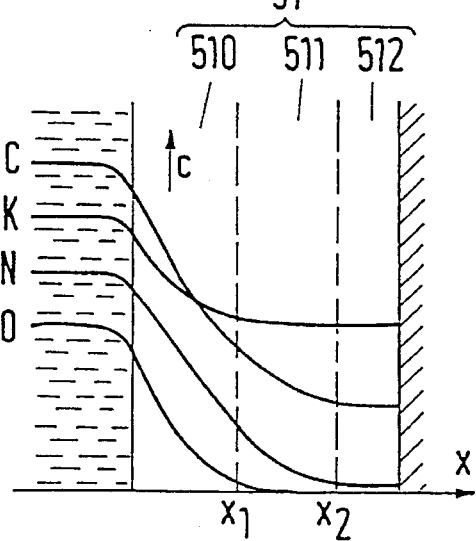

In the case of FIG. 5a it is assumed that no molecular oxygen is present. In the biofilm 51 an anoxic layer 511 and an anaerobic layer 512 can be distinguished. In the case of FIG. 5b there is also an aerobic layer 510. In the aerobic layer 510 the molecular oxygen (curve O) is used in the elimination of carbon until it is exhausted (at $x=x_1$); the nitrate (curve N) diffuses with practically constant concentration gradients through this layer. The denitrification and yield of the nitrate-containing oxygen occurs in the anoxic layer 511, until at $x=x_2$ no more nitrate is present. As the nitrate-containing oxygen is also omitted in the anaerobic layer 512, the easily decomposable carbon (curve C), which diffuses right into this layer, can no longer be decomposed there. With the concentration profiles it is also shown that the carbon which is difficult to decompose (curve K) can only be decomposed with the molecular oxygen.

Figure 6:
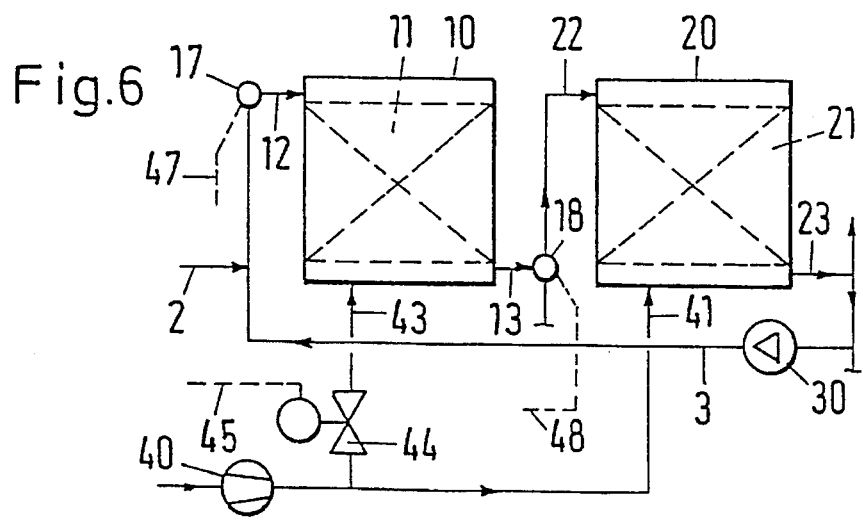
FIG. 6 shows an installation according to the invention (without the flushing means being represented)

With the installation according to the invention, FIG. 6, molecular oxygen is introduced, for example by the supply of process air 43, in metered quantities into the first reaction vessel 10 and in fact via ventilation jets, which are disposed on the lower side of the fixed bed 11. This process air 43 can be conveyed and metered, for example by means of a controlled valve 44, with the same fan 40, which also supplies the process air 41 for the second stage. By measuring the content of organic carbon and/or the nitrate concentration with sensors 17 at the inlet 12 and/or sensors 18 at the outlet 13, measurement signals 47 and 48, respectively, can be produced, which can be converted into a control signal 45 for the metering means 44. If, for example, the concentrations of the nitrate and of the organic carbon are measured at inlet 12, the required amount of oxygen is determined by computer and the metering means 44 are controlled accordingly. With an adjustment of the amount of oxygen by means of measurements at the outlet 13, the control is performed in such a way that as the carbon content increases a greater supply of air is ensured and as the nitrate concentration increases a reduced air supply is ensured.

Figure 7:
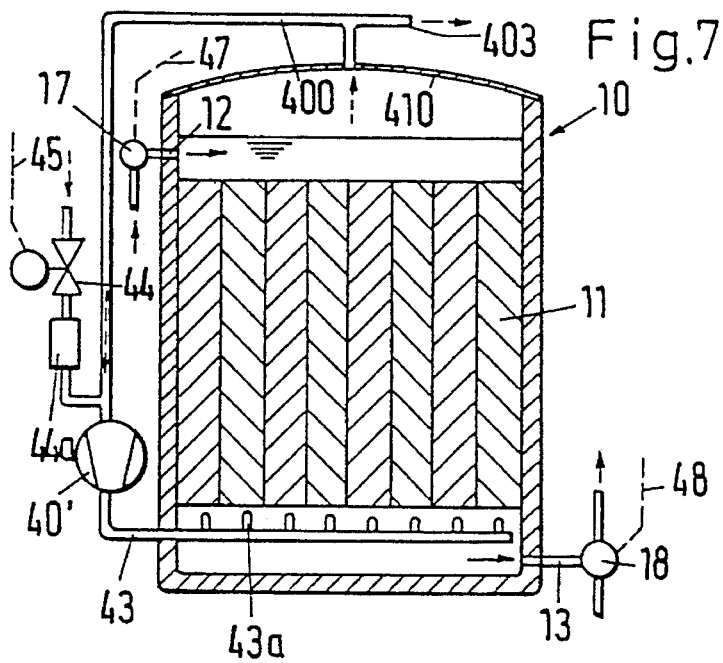
FIG. 7 shows a biofilm reactor according to the invention with ventilation.

As already mentioned, the ventilation also has an advantageous effect on denitrification by promoting the transport of the nitrate from the water into the biofilm. It is therefore recommended that effective ventilation be ensured, even with a low demand for molecular oxygen. So that the amount of oxygen introduced remains small, a reactor 10 constructed as shown in FIG. 7 may be provided. This reactor 10 may replace the corresponding reaction vessel 10 of the installation shown in FIG. 6. The flooded fixed bed 11 of this biofilm reactor 10 may be ventilated with a fan 40' and via line 43 with jets 43a. In the example shown the ventilation jets 43a are disposed beneath the fixed bed; however it is also possible to provide them in the lower region inside the fixed bed. Via the suction line 400, used air low in oxygen is taken in from the closed reactor 10 (covering 410) and at the same time a metered quantity of ambient air is taken in via the controlled valve 44 (flowmeter 44a) by the fan 40'. The excess air is blown away to the environment via the pipe 403. It is in fact possible to perform the ventilation shown in FIG. 7 without the introduction of oxygen. However as the organic carbon generally also comprises constituents which are difficult to decompose, it is sensible always to introduce a certain minimum amount of molecular oxygen into the denitrification stage via the ventilation.

Figure 8A:
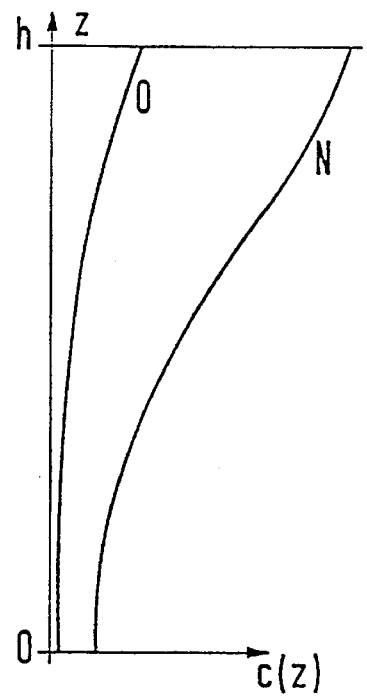
FIGS. 8a–c show concentration profiles in the vertical direction in the denitrifying fixed bed of the biofilm reactor according to the invention.
Figure 8B:
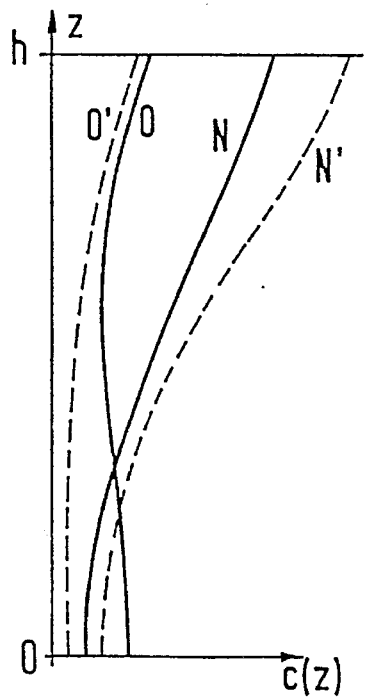
Figure 8C:
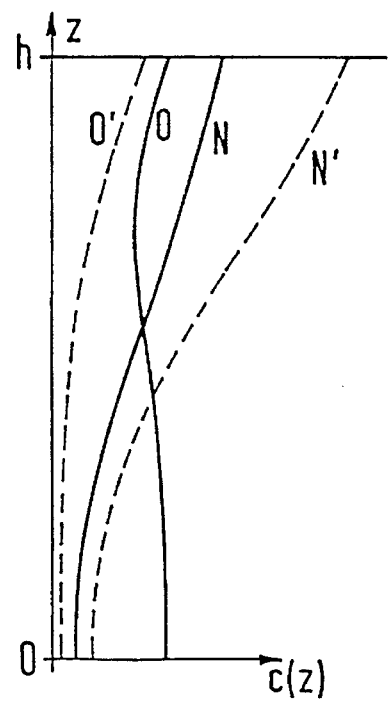

For the installation in accordance with the invention, FIGS. 8a to 8b show the concentration profiles c(z) of the molecular oxygen (curve O) and of the nitrate (curve N) in the fixed bed 11 of the first reaction vessel 10. The z-axis extends in the vertical direction; the lower limit of the fixed bed 11 is given by $z=0$ and the upper limit by $z=h$. The concentrations c(z) are mean values, which relate to a given height z of the fixed bed 11. In the case of FIG. 8a the introduction of oxygen is only performed via the water recirculated from the nitrification stage. Therefore only in the upper region of the fixed bed is an increased oxygen concentration to be found. It is assumed that in the case of FIG. 8a the quantity of nitrate for the elimination of carbon is adequate. If the nitrate concentration of the water to be treated now falls beneath the value which is required for the elimination of carbon, then in accordance with the invention molecular oxygen is introduced into the fixed bed 11 by means of ventilation. This is illustrated by FIGS. 8b and 8c. The curves O' and N' shown by broken lines are the curves from FIG. 8a. The two cases represented differ by the fact that in FIG. 8c the supply of nitrate is less and that therefore a correspondingly greater oxygen concentration is produced in the fixed bed by means of ventilation.

Since according to the invention a metering of the molecular oxygen dependent on the supply of nitrate and the oxygen consumption is provided, there is a flexibility which is not provided with the process performed with the installation represented in FIG. 3. With a variable amount of ammonium and/or nitrate in the untreated water, the invention permits an optimal use of the reaction vessel 10, which is not possible with the known processes. Another factor is that even carbon which is difficult to decompose can be eliminated in the dentrifying reactor by means of the ventilation in accordance with the invention and that the transport of the nitrate from the water into the biofilm is promoted thanks to the turbulence produced.

So that as much easily decomposable carbon as possible is available for denitrification, the amount of oxygenous water returned with the recirculation has to be kept as small as possible. On the other hand, as much nitrate as possible has to be conveyed from the second stage into the first stage. It has been shown that an optimal value for the recirculation normally lies between 200 and 300%; however recirculation between roughly 100 and 400% is also possible.

What is claimed is:

1. A process for biologically purifying used water which includes organic carbon, ammonium and nitrate, the process comprising the steps of: providing first and second reaction vessels for treatment of the used water, the second reaction vessel being downstream of the first reaction vessel, the first reaction vessel having a top, a bottom located generally below the top, and a flooded, fixed bed forming a biofilm reactor; flowing the used water through the first reaction vessel from the top past the flooded fixed bed to the bottom thereof; flowing product water discharged from the first reaction vessel through the second reaction vessel; at least partially converting the ammonium in the water flowing through the second reaction vessel into nitrates with nitric bacteria present in the second reaction vessel; recycling an effluent from the second reaction vessel comprising water including nitrate into the first reaction vessel so that the used water flows with the water including nitrate from the top to the bottom of the first reaction vessel; in the first reaction vessel at least partially decomposing the carbon in the used water with nitrate oxygen; and ventilating a base region of the flooded fixed bed in the first reaction vessel with a metered quantity of molecular oxygen to thereby supplement any deficiency of nitrate oxygen during the decomposing step.

2. A process according to claim 1 including the step of determining the content of at least one of the organic carbon and the nitrate at at least one of an inlet and an outlet of the first reaction vessel, and calculating an amount of molecular oxygen on the basis of said concentrations established during the determining step to thereby control a metering of the molecular oxygen during the ventilating step.

3. A process according to claim 2 wherein the metering step comprises determining the organic carbon and the nitrate concentrations of the water at the outlet of the first reaction vessel, and wherein the metering is performed periodically and in response to the determining step.

4. A process according to claim 1 including the step of adjusting a quantity of water including nitrate being recycled from the second reaction vessel to the first reaction vessel on the basis of the quantity of used water flowing through the first reaction vessel.

5. A process according to claim 3 wherein the quantity of water including nitrate comprises between about 100% and 400% of the quantity of used water flowing through the first reaction vessel.

6. A process according to claim 4 wherein the quantity of the water including nitrate comprises between about 200% and 300% of the quantity of used water flowing through the first reaction vessel.

7. A process according to claim 1 including the step of installing the fixed bed reactor in the first reaction vessel by placing a packing comprising laminar components having a regular geometric structure in the first reaction vessel.

8. A process according to claim 7 including the step of forming an inlet for the used water in the first reaction vessel above the packing of laminar components.

9. A process according to claim 8 including the step of forming an outlet for the used water in the first reaction vessel below the packing of laminar components.

10. A process according to claim 7 wherein the step of ventilating comprises the steps of positioning a plurality of ventilating jets at a lower region of the packing of laminar components, and directing a gas containing molecular oxygen through the ventilating jets towards the packing of laminar components.

11. A process according to claim 10 wherein the step of positioning the ventilating jets comprises the step of positioning the ventilating jets below the packing of laminar components.

12. A process according to claim 10 including the step of adjusting a flow of molecular oxygen through the ventilating jets in response to variations in a nitrate content of the used water.

13. A process according to claim 1 including the step of providing a preliminary treatment stage for the used water upstream of the first reaction vessel, and removing solids suspended in the used water in the preliminary stage.

14. A process according to claim 1 including the step of providing a filtration stage downstream of the second reaction vessel, and removing solids suspended in a product water discharged from the second reaction vessel in the filtration stage.

15. A process according to claim 14 including the step of subjecting the product water in the filtration stage to residual denitrification.

\* \* \* \* \*